(12) United States Patent
Nolfi et al.

(10) Patent No.: US 7,533,698 B2
(45) Date of Patent: May 19, 2009

(54) TRACKABLE, IDENTIFIABLE FOREIGN MATERIAL EXCLUSION DEVICE

(75) Inventors: Thomas Joseph Nolfi, Chardon, OH (US); Mario Michael Nolfi, Willoughby, OH (US); Stephen William Orosz, Vermilion, OH (US)

(73) Assignee: Advanced Pneumatics Inc., Mentor, OH (US)

( * ) Notice: Subject to any disclaimer, the term of this patent is extended or adjusted under 35 U.S.C. 154(b) by 347 days.

(21) Appl. No.: 11/212,837

(22) Filed: Aug. 26, 2005

(65) Prior Publication Data

US 2007/0059162 A1  Mar. 15, 2007

(51) Int. Cl.
  *F16L 55/10* (2006.01)
(52) U.S. Cl. ............... 138/89; 138/104; 138/90; 215/355; 220/789; 220/801; 220/DIG. 19
(58) Field of Classification Search ........... 138/89, 138/90, 104; 215/230, 355, 364; 220/DIG. 19, 220/789, 801
  See application file for complete search history.

(56) References Cited

U.S. PATENT DOCUMENTS

| | | | | |
|---|---|---|---|---|
| 798,031 | A | 8/1905 | Gherky | 138/91 |
| 4,060,100 | A * | 11/1977 | Miller et al. | 138/89 |
| 4,462,430 | A | 7/1984 | Anthony et al. | 138/89 |
| 4,964,438 | A | 10/1990 | Welty | 138/89 |
| 4,984,322 | A | 1/1991 | Cho et al. | 15/104.061 |
| 5,164,575 | A * | 11/1992 | Neeley et al. | 235/472.01 |
| 5,197,605 | A * | 3/1993 | Hampton | 206/582 |
| 5,297,691 | A * | 3/1994 | Bottcher | 220/237 |
| 5,390,964 | A * | 2/1995 | Gray, Jr. | 285/93 |
| 5,558,130 | A | 9/1996 | McCabe et al. | 138/89 |
| 5,623,971 | A * | 4/1997 | Foernzler | 138/89 |
| 5,644,394 | A | 7/1997 | Owens | 356/241.5 |
| 5,690,469 | A | 11/1997 | Deal et al. | 415/189 |
| 5,765,993 | A | 6/1998 | Weiss | 415/209.2 |
| 5,771,937 | A | 6/1998 | Collins | 138/93 |
| 6,032,515 | A | 3/2000 | Huber | 73/49.1 |
| 6,105,618 | A * | 8/2000 | Blaney | 138/89 |
| 6,170,529 | B1 * | 1/2001 | Howe | 138/89 |
| 6,173,491 | B1 | 1/2001 | Goodwater et al. | 29/889.1 |
| 6,244,301 | B1 | 6/2001 | Scott et al. | 138/89 |
| 6,360,779 | B1 * | 3/2002 | Wagner et al. | 138/92 |
| 6,381,797 | B1 | 5/2002 | Filippovitch et al. | 15/104.061 |
| 6,506,014 | B1 | 1/2003 | Nolfi et al. | 415/170.1 |
| 6,726,099 | B2 * | 4/2004 | Becker et al. | 235/380 |
| 6,824,356 | B2 | 11/2004 | Nolfi et al. | 415/170.1 |
| 2006/0001264 | A1 * | 1/2006 | Brass et al. | 285/901 |

* cited by examiner

*Primary Examiner*—Patrick F Brinson
(74) *Attorney, Agent, or Firm*—Hudak, Shunk & Farine Co. LPA (57) ABSTRACT

A foreign material exclusion device which is adapted to be utilized in tubes, pipes, or the like to prevent entry of debris into a potentially sensitive area of an assembly, such as a turbine assembly utilized in a power plant. In one embodiment, the device is adapted to be connected to a non-moving portion of a rotary milling tool, such as the collet, before a milling operation to prevent milling debris from entering a sensitive portion of a tube or pipe. In a further embodiment each device of the present invention includes a unique identifier or identification element, such as a machine readable bar code or RFID (radio frequency identification) tag to insure all devices utilized for a particular job are accounted for.

20 Claims, 6 Drawing Sheets

TRACKABLE, IDENTIFIABLE FOREIGN MATERIAL EXCLUSION DEVICE

FIELD OF THE INVENTION

The present invention relates to a foreign material exclusion device which are adapted to be utilized in tubes, pipes, or the like to prevent entry of debris into a potentially sensitive area of an assembly, such as a turbine assembly utilized in a power plant. In one embodiment, the device is adapted to be connected to a non-moving portion of a rotary milling tool, such as the collet, or connection or guide rod of the collet, before a milling operation to prevent milling debris from entering a sensitive portion of a tube or pipe. In a further embodiment each device of the present invention includes a unique identifier or identification element, such as a machine readable bar code or RFID (radio frequency identification) tag to insure all devices utilized for a particular job are accounted for.

BACKGROUND OF THE INVENTION

Energy supplying power plants, whether nuclear, hydro or fossil fueled, contain numerous turbine assemblies which play an integral part in energy production. Power shortages and outages have become increasingly more common and well publicized in recent years. Both experts and the press have highlighted the fact that few new power plants are being constructed to alleviate the dwindling power supply.

It is important that the turbines in power plants be constructed and maintained with the utmost efficiency. Loss of a large plant during a time of high power demand can cost over five million dollars per hour for replacement power or blackouts if replacement power is not available. The power plants alone can lose millions of dollars when a turbine is down for maintenance or due to breakage. Turbines have a large number of crevices and openings. During maintenance of assembly, small parts, screws, bolts, or other foreign objects can fall into these crevices. If not retrieved or noticed, these small parts have the potential to destroy a turbine and create hazardous situations such as by having a broken rotor piece explode through the turbine housing.

U.S. Pat. No. 6,824,356 relates to a device which can be utilized to temporarily seal substantially any opening on a turbine which is being assembled or repaired. The foreign material exclusion device includes a body, preferably formed from a foamed polymer or rubber. The foreign material exclusion device is substantially elastic or resilient and can be compressed to fit into a desired opening and can be re-expanded to provide a snug fit about an opening. An extraction member is connected to the body and is preferably utilized to remove the device from a portion of a cavity of a turbine.

U.S. Pat. No. 6,506,014 relates to a device which can be utilized to temporarily seal substantially any opening on a turbine which is being assembled or repaired. The foreign material exclusion device of the present invention advantageously maintains fail-safe integrity of desired portions of a turbine. Protection of the sensitive areas of a turbine prevents possible hazardous malfunctions or explosions of a turbine. The foreign material exclusion device is substantially elastic or resilient and can be compressed to fit into a desired opening and can be re-expanded to provide a snug fit about an opening.

SUMMARY OF THE INVENTION

The present invention discloses foreign material exclusion devices that can be individually identified, tracked and accounted for during all phases of construction or repairs or the like on a tube, tube bank, boiler, turbine or other assembly. Thus prevention of the foreign material exclusion devices, and debris or foreign material captured thereby, from becoming lost or trapped within an assembly is avoided, and potentially catastrophic losses are avoided.

In one embodiment, a foreign material exclusion device is disclosed which includes a body which is substantially elastic or resilient and can be compressed to fit into a desired opening and can be re-expanded to provide a snug fit about the opening thereby substantially sealing the same and preventing foreign material such as parts, metal shavings or the like from gaining access to a potentially sensitive area. An extraction member is preferably connected to the body and is preferably utilized to remove the device from the cavity or opening, generally after a predetermined operation has been conducted. The foreign material exclusion device further includes an identification element that uniquely identifies each device utilized at a particular job site. The identification element can be identifying indicia, a bar code, an RFID tag, or the like. In one embodiment, the identification element provides a signal which can be detected and the location of the foreign material exclusion device can be identified to the user.

In a further embodiment, the foreign material exclusion device of the present invention in addition to a resilient body comprises an attachment member which is adapted to removably connect the foreign material exclusion device to a milling tool. In particular, the foreign material exclusion device is adapted to be connected to a non-rotating guide rod or collet rod portion of a rotary milling tool. During use, the foreign material exclusion device remains stationary and attached to the guide rod thereby preventing shavings or other debris generated during the milling operation from gaining entrance to a particular area of the object being milled, such as a tube, pipe, boiler, assembly, turbine assembly, or the like.

BRIEF DESCRIPTION OF THE DRAWINGS

The invention will be better understood and other features and advantages will become apparent by reading the detailed description of the invention, taken together with the drawings, wherein.

DETAILED DESCRIPTON OF THE INVENTION

This description of preferred embodiments is to be read in connection with the accompanying drawings, which are part of the entire written description of this invention. In the description, corresponding reference numbers are used throughout to identify the same or functionally similar elements. Relative terms such as "horizontal," "vertical," "up," "down," "top" and "bottom" as well as derivatives thereof (e.g., "horizontally," "downwardly," "upwardly," etc.) should be construed to refer to the orientation as then described or as shown in the drawing figure under discussion. These relative terms are for convenience of description and are not intended to require a particular orientation unless specifically stated as such. Terms including "inwardly" versus "outwardly," "longitudinal" versus "lateral" and the like are to be interpreted relative to one another or relative to an axis of elongation, or an axis or center of rotation, as appropriate. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship.

The foreign material exclusion devices of this invention are adapted to be utilized in tubes, pipes, or the like in order to protect predetermined sensitive areas from foreign materials or debris. For example, it is desirable to protect a turbine at a power plant from debris as the turbine can be catastrophically damaged by parts, metal shavings, or even foreign material exclusion devices. Foreign material exclusion devices are typically utilized during construction, assembly, repair, or the like of a portion of a product such as, but not limited to, a turbine, pump, fan, housing, boiler tubes, or other devices with limited access openings and cavities.

Referring now to the drawings, a foreign material exclusion device 10 generally comprises a resilient body 20, optionally a retaining member or plate 30, optionally, but preferably, an extraction member 40, and an identification element 50.

The composition of body 20 of the exclusion device is generally a polymer, a rubber, or a polymer or rubber foam. It is important that body 20 is elastic or resilient in nature so that it can be compressed to fit into a desired opening, and yet re-expand to provide a snug fit within or about the opening. The resiliency of body 20 allows the foreign material exclusion device to hold itself in place in a predetermined location or orifice.

Figure 1:
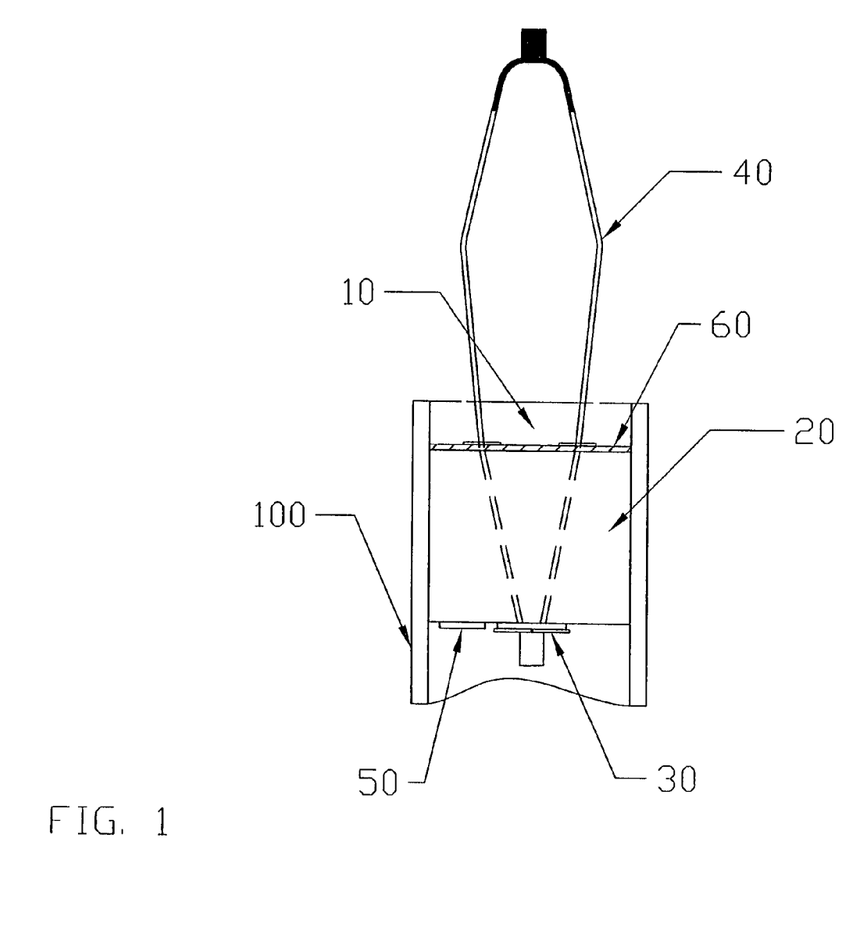
FIG. 1 is a vertical cross-sectional view through a tube illustrating a foreign material exclusion device removably secured therein. The foreign material exclusion device includes an identification element.

The actual size dimensions, i.e. the length, width, and thickness of body 20 of foreign material exclusion devices 10 of the present invention will vary depending on the size and shape of the orifice, tube, opening, etc. which is to be protected or isolated. That is, body 20 of foreign material exclusion device 10 is not limited to one specific geometric or random shape or size such as a cylinder, cube, block, or the like, but is custom tailored or profile fit to the dimensions of generally each cavity or turbine assembly orifice. That said, preferred foreign material exclusion devices have a body 20 that is substantially cylindrical or block shaped. Body 20 is dimensioned to provide a resilient snug fit with the above-mentioned orifice which thereby provides a barrier to the entrance of foreign materials. Foreign materials can generally be defined as any object, particle or the like such as, but not limited to, nuts, bolts, metal bits, debris, hand tools, sockets, measuring devices, or any other material not designed to be located in a desired area of a turbine assembly. The thickness of body 20, generally measured in a direction parallel to the longitudinal direction of walls of tube 100 such as shown in FIG. 1, is sufficient to maintain a snug or tight fit about the desired opening, with body 20 being generally from about 0.5 or about 1 to about 12, desirably from about 2 to about 8, and preferably from about 4 to about 6 inches thick. Dimensions can vary widely by application, with the primary goal of foreign object exclusion requiring sufficient strength to retain the heaviest object used in that portion of the protected device.

Body 20 of the material exclusion device of the present invention is generally formed from a polymer or rubber, and is preferably a foam or foam like material. Foams are cellular materials generally having small hollow spaces which occur during manufacture of the foam. If the cells are fully surrounded by cell walls, the foam is called closed cell foam. In mixed cell foams, the cell walls are partially perforated. In open cell foams, the cells have gas phase connections to each other. Any of the above-mentioned foam types can be utilized in the present invention so long as the foams can be resiliently compressed and prevent the foreign material from entering a predetermined area of the turbine. Generally, open cell foams are preferred as they are more flexible and elastomeric when compared to closed cell foams which tend to be compression resistant.

Suitable polymer compositions which can be foamed to form the body of the present invention include polyethylene, e.g. low density polyethylene and high density polyethylene (HDPE), polypropylene, and copolymers of ethylene or propylene and a monoethylenically unsaturated monomer copolymerizable therewith. Other suitable polyolefins include branched polypropylene homopolymer and branched copolymers of polypropylene. Examples also include copolymers of ethylene and acrylic acid or methyl acrylic acid and $C_1$-$C_4$ alkyl esters or ionomeric derivatives thereof; ethylene vinyl-acetate copolymers; ethylene/carbon monoxide copolymers; anhydride containing olefin copolymers of a diene; copolymers of ethylene and an alpha-olefin having ultra low molecular weight (i.e., densities less than 0.92 g/cc); blends of all of the above resins; blends thereof with polyethylene (high, intermediate or low density), etc.

Other suitable polymeric compositions which may be used in the practice of the invention include, but are not limited to, polyesters, polyamides, polyvinylchloride, polyvinylidene chloride, polycarbonates, polyurethanes, and polystyrene resins.

Rubbers include copolymers of ethylene and propylene and can be prepared by known addition polymerization techniques, including the use of small amounts of a diene such as butadiene. Additional rubber or elastomeric components include various conjugated dienes having from 4-8 carbon atoms such as isobutylene, butadiene, and ethylene/propylene/diene interpolymers may be included in the blend if desired. Rubbers include the aromatic containing rubbers such as styrene, butadiene rubber and the like. Moreover, additional components such as crosslinking agents designed to provide latent crosslinking of the ethylenic or propylenic polymer, such as silane functional crosslinking agents, or covalent or ionic crosslinking agents, may be included if desired.

The thermoplastic polymer material or blend is melt processed in a conventional manner by feeding, melting, and metering into a conventional melt processing apparatus such as an extruder. A volatile blowing agent and an optional crosslinking agent are mixed with the polyolefin polymer or blend under a pressure suitable to form a flowable gel or admixture. A crosslinking agent may be added in an amount which is sufficient to initiate crosslinking and raise the pressure of the mixture to less than that pressure which causes melt fracture of the polymer to occur. The term "melt fracture" is used in the art to describe a melt flow instability of a polymer as it is extruded through a die, which flow instability causes voids and/or other irregularities in the final product. Any other known methods for producing foam compositions can also be utilized to form the foam utilized in the present invention.

The foam blends are generally prepared by heating the desired polymer or rubber to form a plasticized or melt polymer material, incorporating therein a blowing agent to form a foamable gel, and extruding the gel through a die to form the foam product. Prior to mixing with the blowing agent, the resin or blend is heated to a temperature at or above its glass transition temperature or melting point. The blowing agent may be incorporated or mixed into the melt polymer material by any means known in the art, such as with an extruder, mixture, blender, or the like. The blowing agent is mixed with the melt polymer material at an elevated pressure sufficient to prevent substantial expansion of the melt polymer material and to generally disperse the blowing agent homogeneously therein. Optionally, a nucleating agent may be blended in the polymer melt or dry blended with the polymer material prior to plasticizing or melting. The foamable gel or melt is typically cooled to a lower temperature to optimize physical characteristics of the foam structure. The gel may be cooled in the extruder or other mixing device or in separate coolers. The gel is then extruded or conveyed through a die of desired shape to a zone of reduced or lower pressure to form the foam product. The zone of lower pressure is at a pressure lower than that in which the foamable gel is maintained prior to extrusion through the die. The lower pressure may be super-atmospheric or sub-atmospheric (vacuum), but is preferably at an atmospherical level.

The polymer or rubber foam may be open or closed-celled, as desired. The percentage of open cells can be controlled, as is well known in the art, by appropriate selection of blowing agents, additives, polymers, and processing parameters, such as temperatures, pressures, and extrusion rates. The preferred foam of the present invention is polyester and is available from Orbis Manufacturing of Mentor, Ohio.

While the density of the foam can vary, the foams of the present invention are generally considered lightweight and range generally from about 1 to about 200 or 300 $kg/m^3$, desirably from about 5 to about 150 $kg/m^3$, and preferably from about 10 to 20 to about 50, about 75, or about 100 $kg/m^3$.

It is also possible to add various additives such as inorganic fillers, pigments, anti-oxidants, acid scavengers, ultraviolet absorbers, flame retardants, surfactants, processing aids, extrusion aids and the like is suitable as known to those of ordinary skill in the art.

Other additives include inorganic substances such as calcium carbonate, talc, clay, titanium oxide, silica, barium sulfate, diatomaceous earth and the like, carbon dioxide generated by the combination of a bicarbonate or a carbonate of sodium, potassium, ammonium or the like and an inorganic or organic acid such as boric acid, citric acid, tartaric acid or the like, thermal decomposition type chemical foaming agents such as azodicarbonamide, benzenesulfonyl hydrazide, toluene-sulfonyl hydrazide and the like.

The volatile foaming agents usable in this invention generally have a boiling point temperature range of −90° C. to +80° C., and include, but are not limited to, aliphatic hydrocarbons such as n-pentane, isopentane, neopentane, isobutene, n-butane, propane, ethane and the like; fluorochlorinated hydrocarbons such as dichlorotetrafluoroethane, trifluoroethane, trichloromonofluoromethane, dichloro-difluoromethane, dichloromonofluoromathane, and the like. Among them, the non-fully halogenated hydrocarbons are preferred because of environmental considerations. Particularly preferred among the non-fully halogenated hydrocarbons are partially or fully fluorinated hydrocarbons and non-fully halogenated fluorochlorinated hydrocarbons. Examples of these include 1-chloro-1,1-fluoro-ethane, 1,1,1,2-tetrafluoroethane and 1,1-difluoroethane. Particularly preferred among the aliphatic hydrocarbons are isobutene and isobutene/n-butane mixtures. Other blowing agents which may be employed include alcohols such as methanol and ethanol. Also contemplated are inorganic blowing agents such as carbon dioxide, water, nitrogen, argon and combinations thereof, as well as combinations of these inorganic blowing agents with hydrocarbon and/or halogenated hydrocarbon blowing agents. Also decomposable blowing agents, such as azobisformamide, may be incorporated with the volatile foaming agents. Mixtures of any or all of these volatile foaming agents are also contemplated within the scope of the invention. Also contemplated are combinations including water and/or carbon dioxide as the primary blowing agent.

As stated above, the foreign material exclusion device optionally, but preferably includes a retaining member or plate 30, as shown in at least FIG. 1. The retaining member generally provides support to the body in an area where extraction member 40 is attached. Retaining member 30 maintains alignment of extraction member 40 during retraction and prevents the same from being pulled through the relatively less dense foam body. It also assists in the handling of the device during insertion and retraction.

Examples of various bodies, retaining members, etc. are set forth in U.S. Pat. Nos. 6,506,014 and 6,824,356, both to Nolfi et al., herein fully incorporated by reference.

Retaining member 30 can be made from generally any rigid or semi-rigid materials such as, but not limited to, metal, wood, fiberglass, ceramic, carbon fiber, and the polymer or rubber, or polymer foam or rubber foam listed above which has not been foamed and are herein incorporated by reference, e.g. polyethylene, polypropylene, polyvinyl chloride, etc. Preferably, retaining member 30 is polyvinyl chloride. The purpose of the retaining member is to prevent the extraction member from being pulled through the relatively softer body while maintaining alignment of the relative parts.

Extraction member 40 is connected to body 20 through retaining member 30 to allow the foreign material exclusion device to be removed from its location in the turbine assembly once the device is no longer needed. Extraction member 40 is adapted to be removably connected to a rope, string, line, hook, cable, or other retrieval member which can be pulled on by a person in order to allow extraction of the foreign material exclusion device 10. Extraction member 40 may or may not contact body 20 due to the configuration or presence of the retaining member 30, if present. Any number of extraction members 40 can be attached to body 20. Generally, an extraction member forms a loop which is attached to body 20 and retaining member 30, if present. As shown in FIG. 1, two ends of extraction member 40 have each been inserted through a recess of retaining member 30 and thus through the body. The ends are tied or otherwise suitably fastened to preferably form a loop and a piece of shrink-wrap is optionally attached to the knot to prevent the same from becoming untied or undone. Extraction member 40 is generally a rope, line, or cable made from any woven or nonwoven, natural fiber, such as cotton, or synthetic material such as nylon or non-foamed thermoplastic as stated hereinabove. Nylon is preferred.

Figure 6:
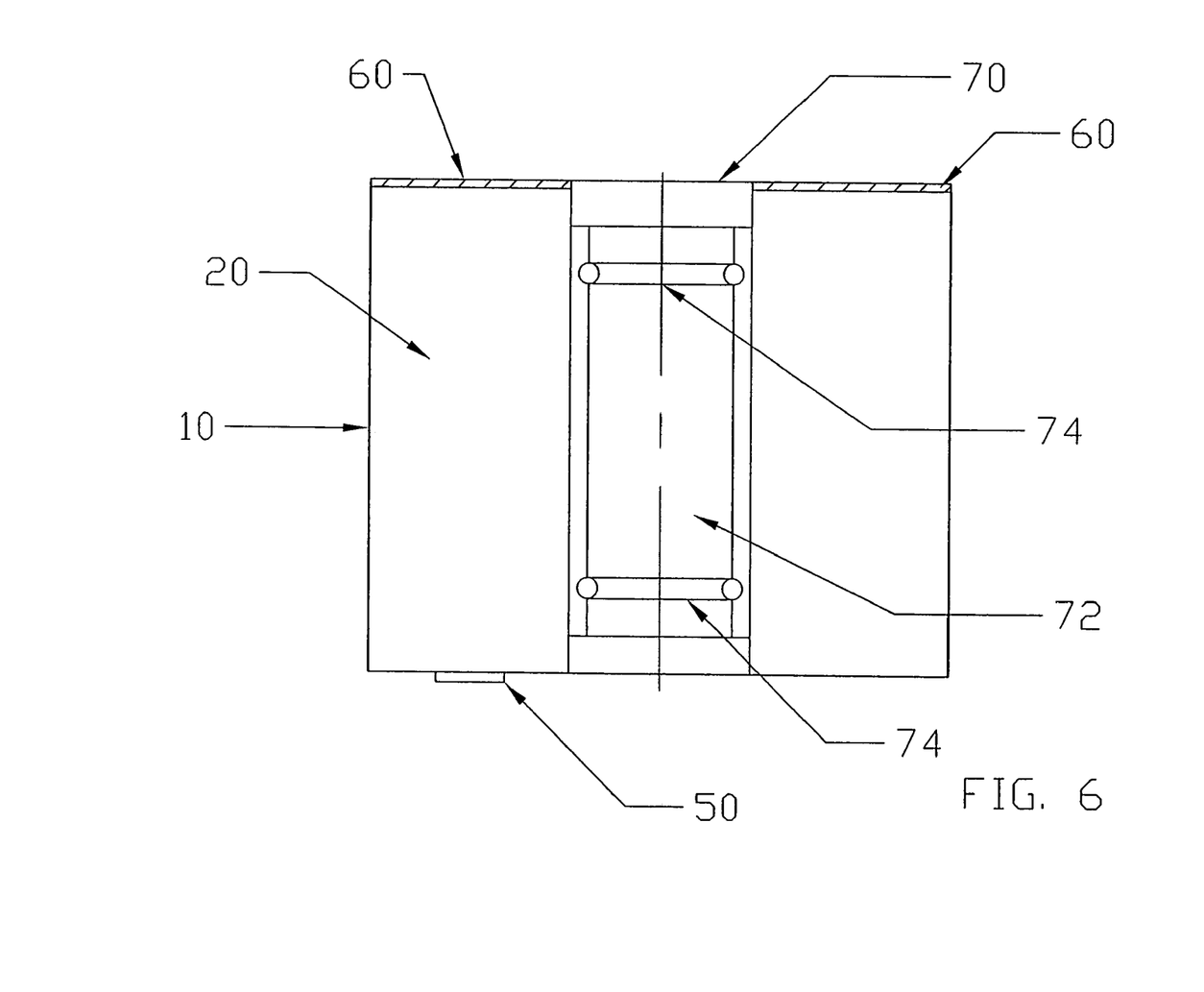
FIG. 6 is a cross-sectional view of a foreign material exclusion device adapted to be connected to a rotary milling tool.

Optionally, but preferably, a flame retardant, resistant, or quenching coating or covering 60 is applied to any of the foreign material exclusion devices 10 described with this application, preferably on at least body 20 thereof. The flame retardant coating or covering 60 can be applied to one or more sides of the body, especially the portion thereof which can be exposed to high temperature debris, chips, filings, etc., such as from a welding or cooling process on the turbine assembly or repaired boiler tubes or pipe, see FIG. 1. The coating or covering 60 is also heat resistant. As illustrated in FIG. 6, a foreign material exclusion device 10 includes a flame retardant, resistant, or quenching coating 60 on the top surface thereof. The coating or covering 60 is any suitable thickness to provide the desired flame or heat resistant properties. In one embodiment, the coating or covering 60 is on top of or in surface contact with at least a portion of the device, and in a second embodiment, saturates a portion of the body of the device in addition to being present on a surface. Coating or covering 60 on the foreign material exclusion device 10 has a sufficient thickness to achieve the desired goal of providing flame retardant, flame resistant, or the like properties. Coating or covering 60 thickness may vary from surface to surface and vary on a single surface, and ranges generally from about 0.010 to about 0.25 inches, desirably from about 0.020 to about 0.20 inches, and preferably from 0.05 to about 0.15 inches.

Such coatings are well known in the art and are generally latexes such as HCF from PDI, Inc. of Circle Pines, Minn. Coverings of the present invention include, but are not limited to, woven and nonwoven, natural and synthetic fibers, and are available from Sandel of Amsterdam, N.Y. as Non-Combustible Fiber. In other embodiments, coverings are a layer(s) of organic or inorganic material, or a combination thereof, such as a polymer layer or a graphite layer.

The flame retardant coating or covering 60, or combination thereof, is applied to at least one surface of a foreign material exclusion device 10 of the invention utilizing one or more methods, including but not limited to, spray coating, roll coating, screen printing, bonding, or the like. Flame retardant coverings in one embodiment are applied utilizing an adhesive comprising a hot melt adhesive, an epoxy, a polyurethane, a phenolic resin or the like, with the adhesive disposed between the covering and foreign material exclusion device body surface. Hot melt adhesives are preferred in one embodiment. In a preferred embodiment, a sheet of body material having a predetermined thickness is coated with the coating on at least one surface by roll coating, spraying or the like. Afterwards, one or more, and preferably 2 to about 50 or about 100 foreign material exclusion device bodies are formed from the coated sheet. In one embodiment, body 20 is cut from the sheet, preferably with a die cutting apparatus, waterjet cutting apparatus, or cold laser as known in the art.

In one embodiment, the foreign material exclusion device 10 includes a unique identifier or identification element 50 that can be used to track the device before, during and/or after use at a job site, etc. Various identification elements 50 are illustrated in FIGS. 1-6. Any number of foreign material exclusion devices 10 having an identification element 50 can be tracked at the same time. The foreign material exclusion device 10 comprising an identification element 50 can be used to prevent potentially costly shutdowns due to user error of leaving a foreign material exclusion device 10 in an opening or orifice of a tube 100, or other cavity unintentionally. Also, a large number of foreign material exclusion devices, such as for example from 100-1,000, can be efficiently tracked, both prior and subsequent to application.

Identification elements 50 can range from relatively non-complex items to functionally advanced devices utilizing state-of-the-art tracking systems. Identification elements 50 include indicia 51 such as, numbers, letters, symbols, or the like, or combinations thereof arranged in any order or sequence on the foreign material exclusion device 10 or a substrate, such as a label, which is connected to the foreign material exclusion device 10, see FIG. 4. Identification elements 50 can be printed or embossed on various parts of the device. Identification elements 50 further include bar codes 53 and RFID tags 52 which are machine readable. Accordingly, in one embodiment of the invention, a plurality of foreign material exclusion devices 10 are provided wherein each device includes an identification element 50 having a different identifying characteristic, signature, number, etc.

Figure 3:
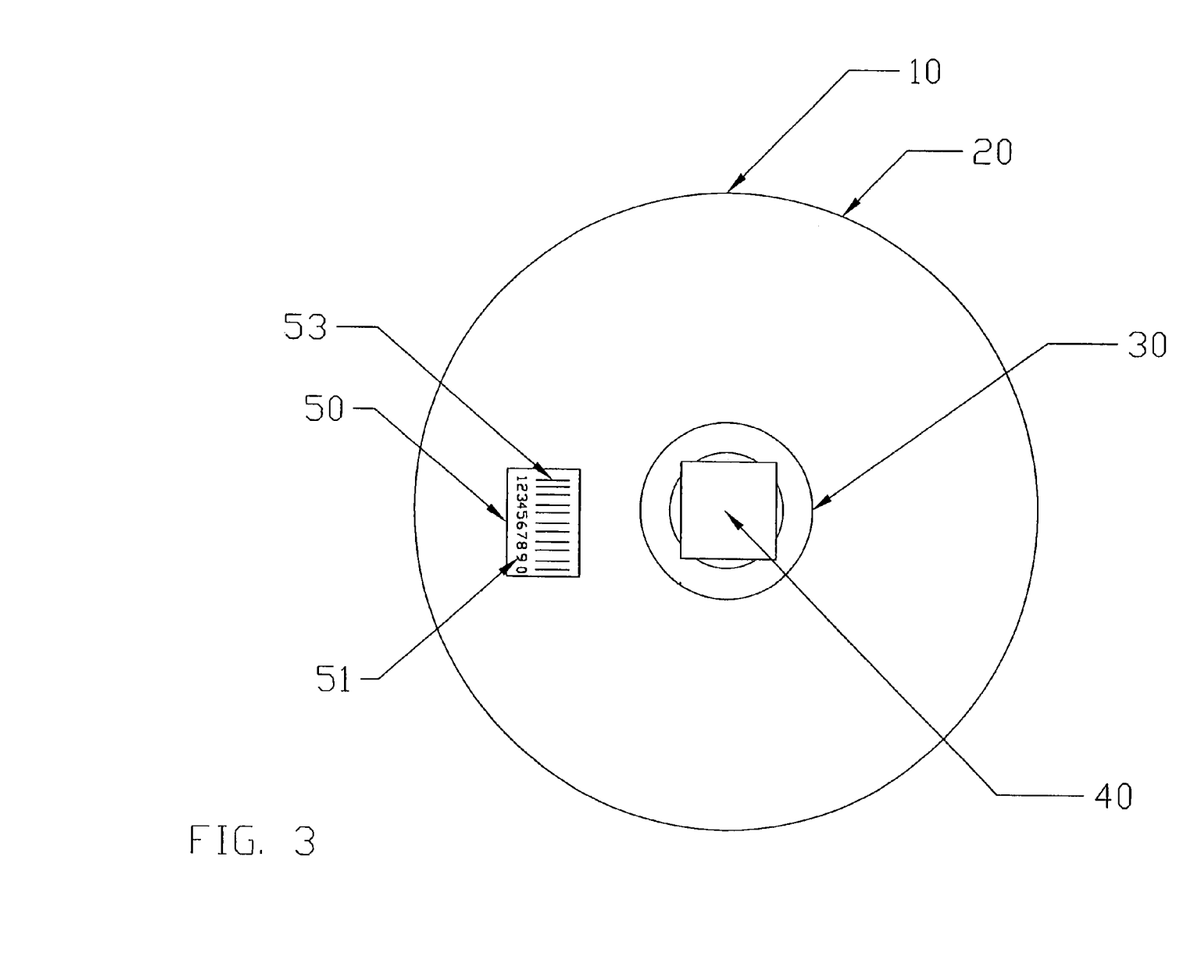
FIG. 3 is a bottom view of a foreign material exclusion device including a bar code identification element.

Bar codes 53 are preferred identification elements 50 in one embodiment of the present invention. The most common bar codes 53 are symbols consisting of a series of bars and spaces which can be applied to the foreign material exclusion device 10, as shown in FIG. 3. Data encoded in the bar code 53 can comprise part numbers, a serial number, a supplier number, or other data. The bars and spaces or other objects in each symbol are grouped in such a way to represent the encoded data. Many different types of bar code systems exist. A basic bar code scanning system utilizable in the present invention generally includes a scanner, a decoder, a computer, a bar code, and a printer. Numerous other bar code system configurations exist utilizing some or all of the above-described basic system components. The scanner and decoder together input and read bar codes 53 into a computer system while the printer generates bar codes for labeling.

Numerous different types of decoders exist such as wedge decoders, software decoders and serial decoders. Wedge decoders are external devices that wedge between the keyboard and the terminal. Software decoders perform the complete decoding in software running on a computer. Serial decoders connect into the communications port of the computer. Decoder scanners can either connect via the keyboard wedge or a serial port of a computer.

Scanners are generally contact or non-contact. Contact scanners require physical contact to scan the bar code 53 as opposed to non-contact scanners which can be several inches to several feet away. Both types of scanners can be utilized in the present invention. The computer contains a commercially available bar coding system program. A printer operatively connected to a computer can be used to generate bar codes 53 which can be applied to the foreign material exclusion devices 10. The bar code system is able to collect and interpret the data transmitted from the scanner and links the bar code information to a detailed file on that item. Accordingly, product description and inventory of the foreign material devices are available thereby allowing easy tracking of the same. Bar codes and bar code systems are commercially available from sources such as Wasp Bar Codes, Symbol Technologies, Metrologic, and PSC.

Figure 2:
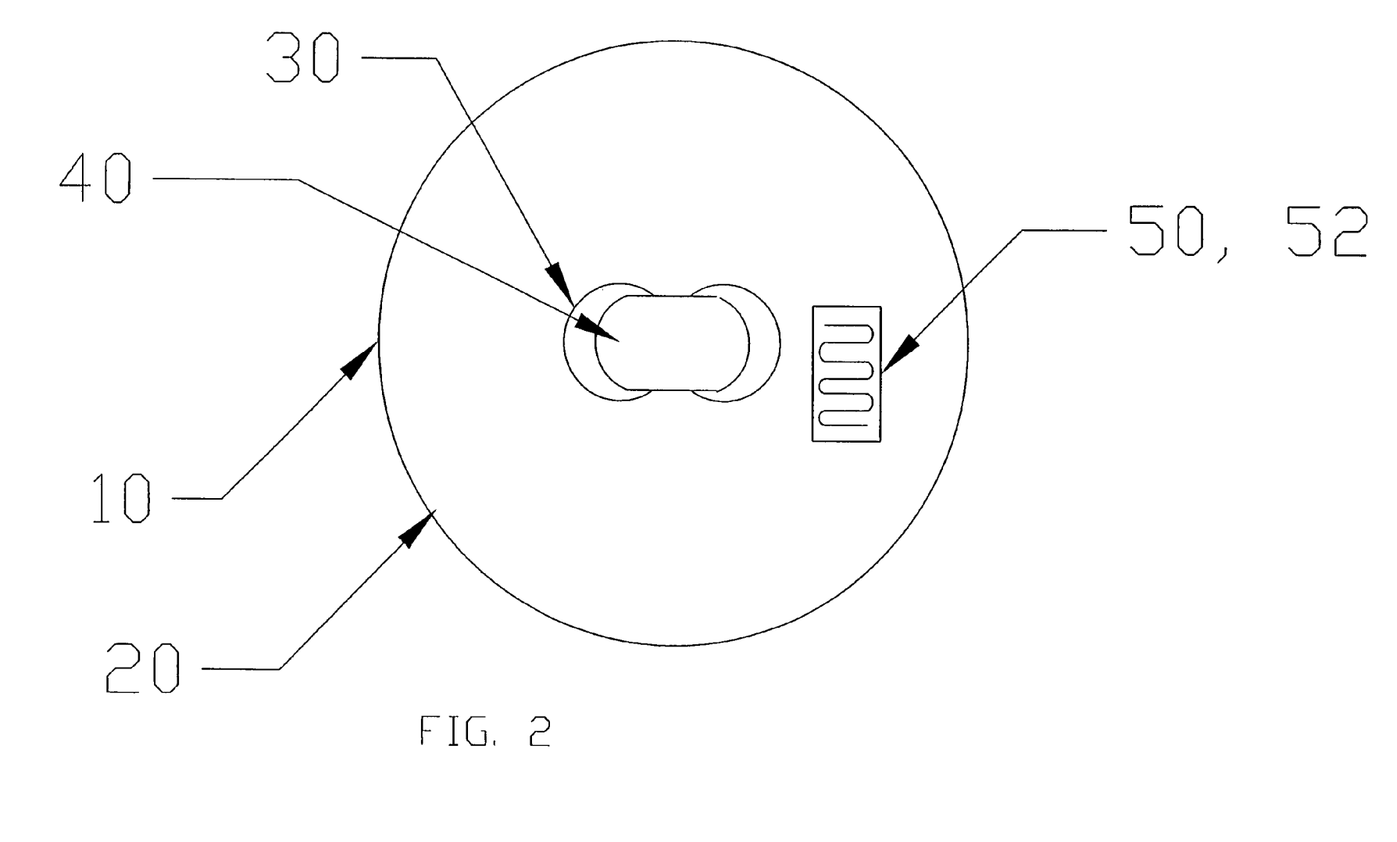
FIG. 2 is a bottom view of a foreign material exclusion device illustrating an identification element, particularly an RFID tag.

Radio Frequency Identification (RFID) is utilized on foreign material exclusion devices 10 of the present invention in a further embodiment, as shown in FIG. 2. An RFID tag 52 contains unique information that identifies the foreign material exclusion device 10 it is attached to and can share that information wirelessly with computer databases and networks so that the foreign material exclusion device 10 can be tracked efficiently. The RFID system generally comprises two components, namely, an interrogator, also called a reader, and a tag 52, also called a transponder or "slave" that has a unique identification code. Data is exchanged between tags and readers using radio waves between the tag and the reader, and no direct line of sight is required for the transaction. Accordingly, foreign material exclusion devices 10 containing RFID tags 52 can be identified even in tubes, pipes, or other orifices. The reader asks the tag for the code, or processes the signal being broadcast by the tag, decodes the transmission and transfers the data to a computer. The computer in turn, may simply record the reading, or look up the tag ID in a database to direct further action, and may also direct the reader to write additional information to the tag. RFID technology allows a plurality of individual foreign material exclusion devices 10 within a group to be uniquely identified at the same time.

RFID tags 52 are generally passive or active. Passive tags generally have no internal power source but serve to identify the object attached thereto. Active tags often have their own power source and are generally rewriteable to provide flexibility to update data thereto. The RFID tag 52 generally contains a chip as well as an antenna which are mounted on a substrate, such as label material. The label material can be printed upon or pre-coated for use. Many different sizes of RFID tags 52 are available, with sizes ranging from fractions of an inch to about 1"×2", and 4"×6". RFID tags 52 and systems are commercially available from sources such as LXE, Zebra, or the like.

In one embodiment, the identification element 50 is attached to an outer surface of the foreign material exclusion device 10 such as on the body 20, retaining member 30 or extraction member 40. In a preferred embodiment, the identification element 50 includes an adhesive layer or other fastening element which allows the same to be secured to a portion of the foreign material exclusion device 10. In a preferred embodiment, the identification element 50 is attached to an upper or lower surface of the body, as opposed to a side which contacts the orifice or opening the foreign material exclusion device 10 is designed to be placed therein in order to prevent the passage of debris from one side of the orifice to another. The foreign material exclusion device 10 may also contain a specialized antenna to extend the range of the RFID chip when used within boiler tube and turbine assemblies.

In yet another embodiment of the present invention, a foreign material exclusion device 10 is utilized to prevent foreign or other unwanted material from entering a predetermined area of an apparatus 110 or other construction such as a turbine, tube, boiler or other assembly. In a preferred embodiment, the device 10 is connected to a portion of a tool, such as a milling tool 120 having a rotary head, preferably utilizing a friction fit or a connection element 70. Preferably, the device is placed between a cutting head or element 122 of the milling tool 70 and in areas desired to be kept free of foreign material, as shown in FIG. 5.

Figure 5:
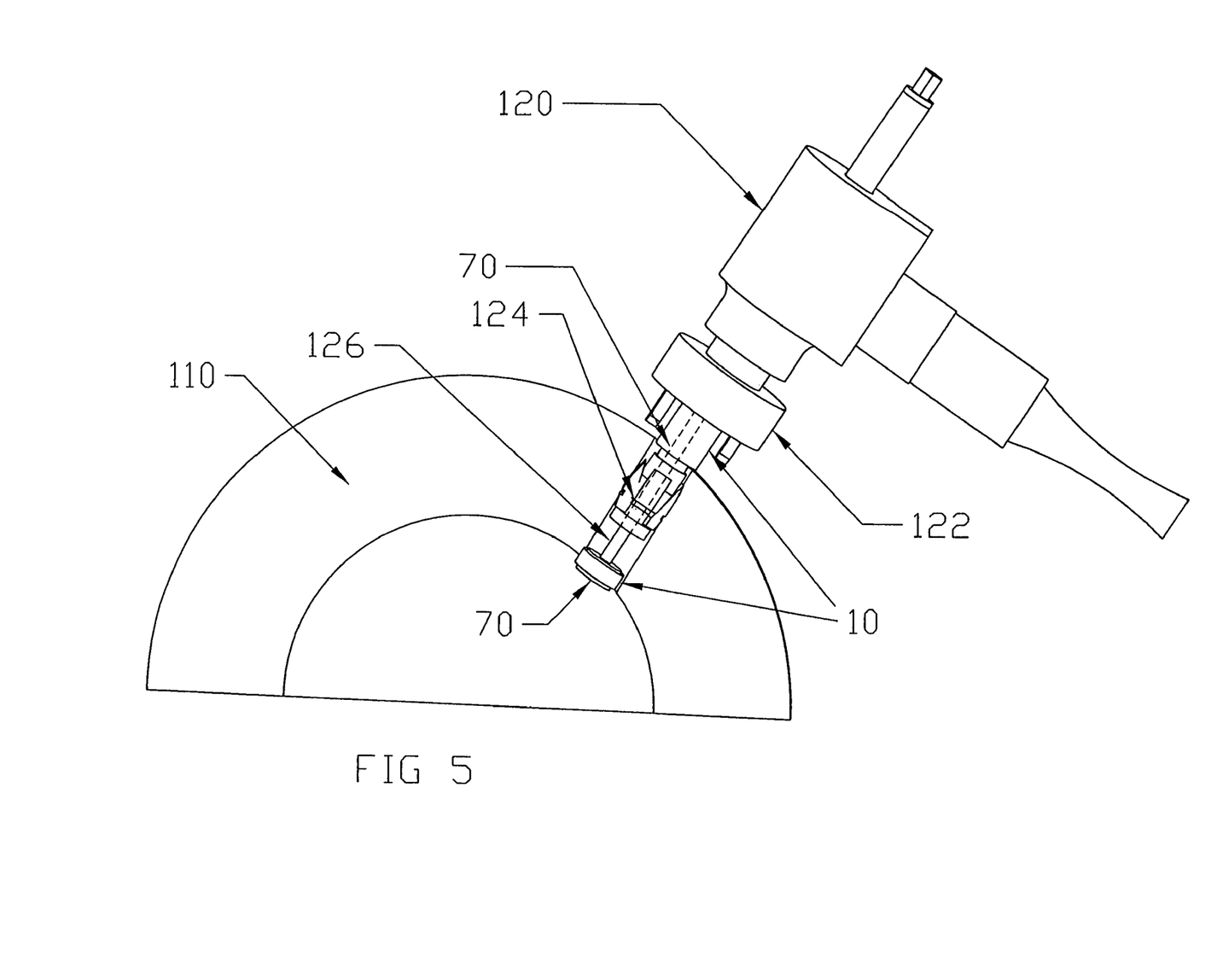
FIG. 5 is a cross-sectional view of a further embodiment of a foreign material exclusion device connected to a rotary milling tool and located at an example position during use.

One embodiment of a tool mounted foreign material exclusion device 10 is illustrated in FIG. 5. The device 10 includes a body 20 having an opening or bore 72, which preferably contains a connecting insert or element 70 for mounting on a tool. In one embodiment, the connection element 70 is of the same construction as, and thus a part of the body 20. In this instance, a pressure or friction fit generally connects the device to the tool. The composition of the connecting element 70 is the same as described for body 20 herein, and preferably is a polymer or rubber or foam thereof. In other embodiments, preferred connecting elements 70 are a polymer, metal, rubber, wood, or the like, or a combination thereof with polymeric inserts preferred. Generally any rubber or polymer can be utilized, including thermoplastic or thermoset polymers. In one embodiment, the connecting element 70 includes an o-ring 74 (FIG. 6), preferably of rubber or another elastomer, or thread, or a combination thereof which is used to secure the device to a portion of a tool, such as a non-rotating shaft 126 thereof. In other embodiments, the device is connected to a portion of a tool by a connector such as a nut, cotter pin, or the like.

A non-limiting example illustrating the use of the device follows. In one embodiment, one or more foreign material exclusion devices 10 are attached to a portion of a milling tool 120 as shown in FIG. 5. In this example, the devices 10 are attached to shaft 126 of the tool 120 by a friction fit of connection element 70. Device 10 is situated on the milling tool 120 below the cutting or milling head 122 which is utilized to perform a machining operation such as cutting or drilling on an object having a cavity, bore, orifice, or the like, such as a boiler water wall, a tube, or a turbine assembly, etc. As shown in FIG. 5, the milling head is designed to perform a stub removal operation on apparatus 110, which in this example is a boiler collection header. The stub must be machined out of the wall before a new tube is inserted The importance of a foreign material exclusion device 10 is critical, as boiler steam collection headers have limited access to retrieve debris. Debris left in headers have direct accesses to critical elements of the power plant, such as control valves and turbines. Power plant headers have a finite life generally tracked in length of operation or more critically "cycles". Cycles are counted as the header is energized and de-energized as the plant is started and stopped. As the U.S. power system is increasingly relying on plants older than their original design life (approximately 20-30 years), increasing repair of headers is occurring necessitating improved foreign material exclusion devices 10.

Figure 4:
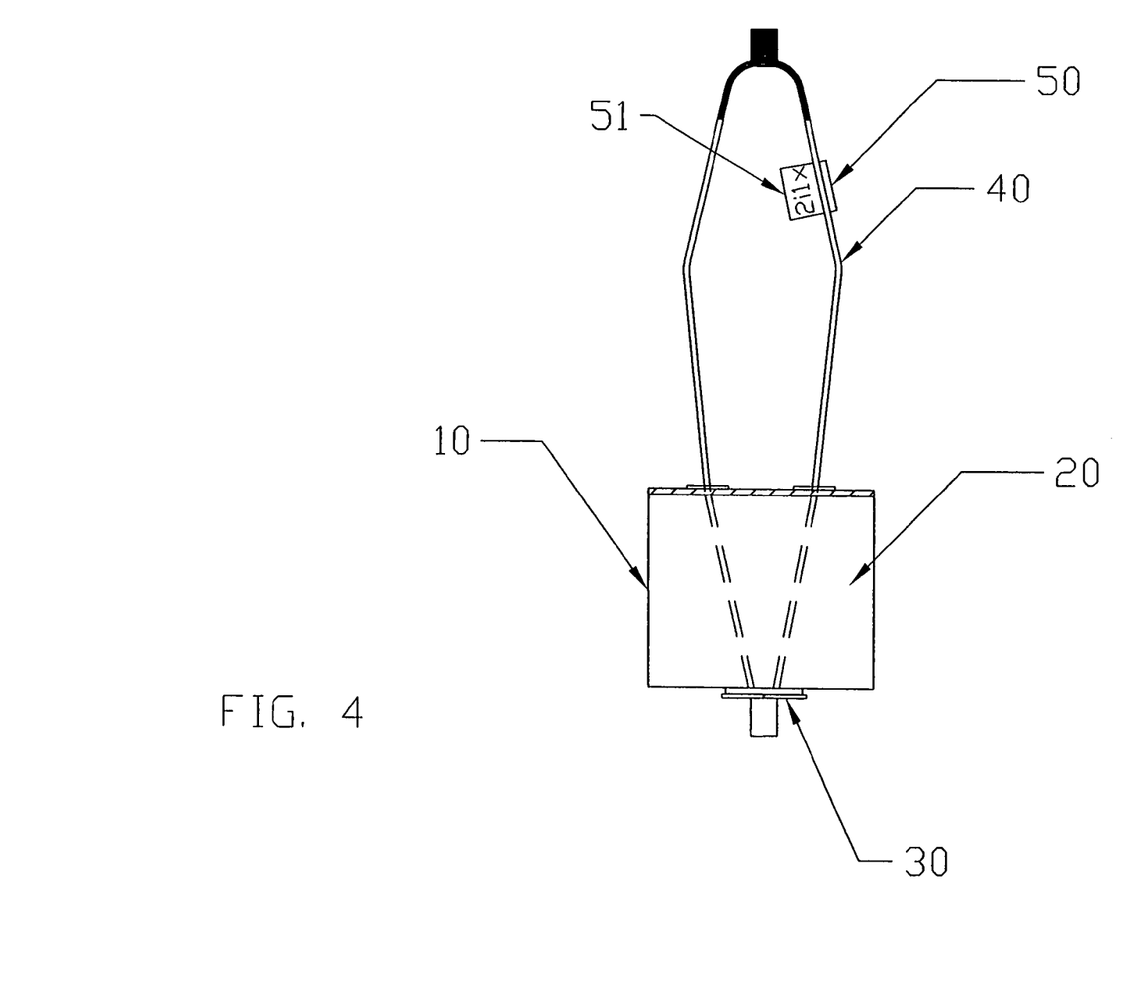
FIG. 4 is a side view of a foreign material exclusion device including a substantially cylindrical body and further including an identification element including identifying indicia.

During a typical milling operation, foreign materials such as, but not limited to, metal pieces, filings, shavings, or the like are generated. As noted herein, the foreign materials can have undesirable, deleterious or even catastrophic effects if they are allowed to enter and remain in the orifice or cavity, etc. Accordingly, as shown in FIGS. 1 and 5, the foreign material exclusion device 10 is situated in the orifice in such a manner to substantially prevent, and most preferably prevent foreign material from entering or breaching a predetermined area, such as boiler inner area. As the body 20 of the foreign material exclusion device 10 is elastic or resilient, a snug or compression fit is obtained in the orifice. The milling head of a milling tool is then utilized to machine or shape the intended object as known in the art. In a preferred embodiment, the foreign material exclusion device 10 is connected to a portion of the milling tool 120 which does not rotate. As known in the art, a collet or other device can be used to secure tool in orifice. Milling tools are well known in the art and are commercially available from sources such as H&S Tool, Inc. of Wadsworth, Ohio. As noted herein, the dimensions of the foreign material exclusion device 10 are varied in order to fit the intended application. For example, the body material in some embodiments has dimensions such as width, which are from about 2.5 to about 4.0 percent, and preferably from about 5 to about 10 percent greater than the respective dimensions of the orifice to provide a snug fit for foreign material exclusion. The foreign material exclusion device 10 can have a body 20 of any desired shape or size, and thus can be cylindrical, spherical, or have dimensions as noted for device herein. Foreign material exclusion device 10 is illustrated in FIGS. 2-4 having a body cross section or profile which is circular, and appropriately sized to fit in a tube or other opening of a boiler. Further non-limiting examples of device profiles are an oval, square, rectangle, or any other geometric or irregular shape. The thickness, i.e., width, of the body is variable, but generally sufficient to maintain a snug or tight fit within the predetermined orifice, such as cylindrical orifice of the boiler wall. The thickness or height of the body varies by application and is sufficient to exclude foreign materials.

In accordance with the patent statutes, the best mode and preferred embodiment have been set forth, the scope of the invention is not limited thereto, but rather by the scope of the attached claims.

What is claimed is:

1. An identifiable foreign material exclusion device for preventing foreign material from accessing a predetermined location in a cavity, comprising:
a resilient body and an extraction member operatively connected to the body, wherein the device further includes an identification element that provides the device with an identifying characteristic adapted to be unique compared to at least a second foreign material exclusion device, wherein the identification element is an RFID tag that is adapted to be detected by a reader of an RFID system, wherein the body comprises a polymer, a rubber, or a polymer foam or rubber foam, wherein the extraction member includes a loop or the extraction member and body form a loop for aiding in removal of the device from the cavity, and wherein the body is compressible and adapted to be capable of fitting into the cavity and thereafter re-expandable to hold the device in place via a compression fit of the body in an internal location in the cavity thereby sealing a first side of the cavity from a second side of the cavity.

2. The device according to claim 1, wherein the body includes a flame resistant or retardant coating or covering on at least a portion of a surface of the body.

3. The device according to claim 1, wherein said body is the polymer or rubber foam comprising polyester, polyethylene, polypropylene, or copolymers thereof, and wherein the body is from about 0.5 to about 12 inches thick.

4. The device according to claim 3, wherein the identification element is connected to an upper or lower surface of the body or to the extraction member.

5. A foreign material exclusion system, comprising:
a first foreign material exclusion device adapted to seal a first side of a first cavity from a second side of the first cavity, wherein the first foreign material exclusion device includes an identification element that provides the first device with an identifying characteristic; and
a second foreign material exclusion device adapted to seal a first side of a second cavity from a second side of a second cavity, wherein the second foreign material exclusion device includes a second identification element which has a different identifying characteristic than the first foreign material exclusion device identification element, wherein the first and second identification elements comprise, independently, an RFID tag, each tag being detectable by a reader of an RFID system, wherein the first and second foreign material exclusion devices each have a body comprising a polymer, a rubber, a polymer foam, or a rubber foam, wherein the bodies of the first and second foreign material exclusion devices are compressible and adapted to be capable of fitting into the respective cavities and thereafter re-expandable to hold the first and second devices in place via a compression fit of the bodies in a location in the first and second cavities.

6. The device according to claim 5, wherein each body includes a flame resistant or retardant coating or covering on at least a portion of a surface, wherein the body is from about 0.5 to about 12 inches thick.

7. The device according to claim 5, wherein said body is the polymer or rubber foam comprising polyester, polyethylene, polypropylene, or copolymers thereof 8. The device according to claim 5, wherein the body has an upper surface, a lower surface, and a side adapted to contact the cavity, wherein the identification element is attached to the upper or lower surface of the body, wherein the body is the polymer foam or rubber foam.

9. A foreign material exclusion device assembly adapted to temporarily seal a cavity of an apparatus being assembled or repaired, said foreign material exclusion device assembly, comprising:
a resilient body, said body comprising a polymer, a rubber, or a foam thereof, said body being compressible and adapted to be placed in said cavity and thereafter re-expandable to hold the device in place via a compression fit of the body in a predetermined location between a first side and a second side of the cavity in order to seal said first side from said second side and prevent a foreign material from entering said first side to said second side, said body having a bore extending between a top surface and a bottom surface, and
a connection element in said body bore, said connection element having a bore extending between the body top surface and bottom surface and connected to a non-rotating guide rod or collet rod portion of a milling tool, the milling tool also comprising a milling head connected to the milling tool, and wherein the milling head is rotatably located between the milling tool and the foreign material exclusion device.

10. The device according to claim 9, wherein said device further includes an identification element that provides the device with an identifying characteristic adapted to be unique compared to at least a second foreign material exclusion device.

11. The device according to claim 10, wherein the identification element comprises indicia, a substrate with indicia, a bar code, or an RFID tag.

12. The device according to claim 9, wherein the connection element is substantially cylindrical and is connected to a central portion of the body.

13. The device according to claim 12, wherein the body is from about 0.25 to about 4 inches thick.

14. The device according to claim 13, wherein the body comprises the polymer foam or the rubber foam, wherein the foam has a density of about 1 to about 200 kg/m$^3$, and wherein the connection element includes an o-ring or thread or a combination thereof that secures the device to the non-rotating rod of the milling tool.

15. The device according to claim 14, wherein the body on at least one surface includes a flame resistant or retardant covering or coating.

16. The device according to claim 4, wherein the body has an upper surface, a lower surface, and a side adapted to contact the cavity, wherein the identification element is attached to the upper or lower surface of the body, and wherein the body is the polymer foam or rubber foam.

17. The device according to claim 16, wherein the identification element is attached to the lower surface of the body.

18. A method for temporarily sealing a cavity of a tube, pipe or orifice with a foreign material exclusion device to prevent foreign material from accessing a predetermined location in the cavity and tracking the device, comprising the steps of:
providing a foreign material exclusion device comprising a resilient body and an extraction member operatively connected to the body, wherein the device further includes an identification element that provides the device with an identifying characteristic adapted to be unique compared to at least a second foreign material exclusion device, wherein the identification element is an RFID tag that is adapted to be detected by a reader of an RFID system, wherein the body comprises a polymer, a rubber, or a polymer foam or rubber foam, wherein the extraction member includes a loop or the extraction member and body form a loop for aiding in removal of the device from the cavity, removably securing the foreign material exclusion device in the cavity via a compression fit of the body in an internal location in the cavity thereby sealing a first side of the cavity from a second side of the cavity to prevent the passage of debris from the first side of the cavity to the second side, and tracking the location of the device in the tube, pipe or orifice using the RFID system.

19. The method according to claim 18, wherein the RFID tag provides a signal that can be detected by the reader whereby the location of the foreign material exclusion device is tracked.

20. The method according to claim 18, wherein said body is the polymer or rubber foam comprising polyester, polyethylene, polypropylene, or copolymers thereof, wherein the body is from about 0.5 to about 12 inches thick, and wherein the RFID tag is connected to an upper or lower surface of the body or to the extraction member.

* * * * *